Patented Jan. 3, 1939

2,142,331

UNITED STATES PATENT OFFICE 2,142,331

ELECTRON EMITTING CATHODE

Charles H. Prescott, Jr., East Orange, N. J., assignor to Bell Telephone Laboratories, Incorporated, New York, N. Y., a corporation of New York No Drawing. Application March 9, 1935, Serial No. 10,245

17 Claims. (Cl. 250—27.5)

This invention relates to electron emitting cathodes and more particularly to coating compositions and methods of preparing and activating the cathodes.

All cathodes of the oxide coated type require some process to develop the electron emissive properties of the coating. In one class of processes, active metals are vaporized from an auxiliary source and condensed upon the cathode, but more commonly the coated cathode is subjected to an activation process which entails the production of small amounts of free active metal which are dispersed throughout the matrix, adsorbed upon the surface and are associated with the characteristic electron emissive properties of the cathode surface. These small amounts of free active metal are derived by the reduction of suitable compounds placed upon the cathode in the coating process, but the conventional processes are highly involved, obscure as to their real mechanism and difficult to control as manufacturing procedures.

An object of this invention is to obtain reproducible electron emitting surfaces in discharge devices regardless of the mechanical configuration of the emitter.

Another object of the invention is to reduce the cost of manufacture of efficient electron emitting electrodes.

A fundamental feature of this invention relates to an activating process which embodies the chemical reduction of earth metal compounds to active metals by a metallic reducing agent incorporated in the cathode coating. The only necessary treatment is to heat the cathode in a vacuum, such as the enclosing vessel of the device in which it is mounted along with other cooperating electrodes. This promotes a rapid and economical process which is, furthermore, substantially controlled by the coating composition so that the product is of a uniform quality.

The activated coating of such a cathode will be a composite matrix comprising in general the free earth metal, a residual quantity of the metallic reducing agent and the oxides of both the earth metal and the metallic reducing agent.

The residuum of metallic reducing agent serves as a depository surface for the active metal which will be adsorbed upon or alloyed with the finely divided particles to serve as a reservoir supply, when it may be subsequently furnished to the surface layer of active metal by diffusion through the matrix. The residual oxides of the metallic reducing agent and of the earth metals serve as a mechanical separating material by preventing the sintering of the reducing agent and maintaining a condition of extremely fine division of the depository metal, thereby preserving a widely extended surface for the deposition and retention of the active earth metal.

A wide range of control over the composition of the matrix and the activated coating promotes the adaptation of the surface to different uses and various manufacturing processes. The requisite amount of mechanical separating material may be derived from a large excess of the unreduced earth oxide in addition to the oxide formed by oxidation of the metallic reducing agent. Some of the earth oxides, in particular the alkaline earth oxides, are difficult to prepare and maintain in a pure state in air, for which reason other compounds which decompose to the oxides are employed in the coating process. But such compounds may react prematurely with the metallic reducing agent. For this reason it may be desirable to employ only a small amount of earth metal compound sufficient to generate the needed active free earth metal, but insufficient to leave a residue of oxide great enough to serve as the separating medium in the matrix. In this case it may be desirable to add an additional refractory compound to the coating which for convenience may be the oxide of the metal employed as the reducing agent.

The terms "earth metals" and "earth metal compounds" are intended to apply to both alkaline earth metals and compounds and rare earth metals and compounds.

As described above, the residuum of the metallic reducing agent may serve as the depository surface for the active earth metal. But this function of the retention of the deposited metal may be supplemented or replaced by the addition of another metal or its compound which is easily reduced during the cathode formation process and which may offer a more receptive surface for the active metal or assist in obtaining the optimum proportion of free depository metal to the residual oxide which, in conjunction with the requisite active metal, corresponds to the highest electron emissivity.

In accordance with one aspect of this invention, a cathode is provided with a coating composition or matrix of one or more compounds of earth metal, an inert separating material, and a finely divided metallic reducing agent of metals contained in the III and VI series of the periodic table in the III and IV groups, the inert material, preferably being the oxide of the reducing metal constituent.

According to another aspect of the invention, an additional metal or its compound may be combined in the coating, the metal being less volatile than the active metal and more easily reducible from its compound, if added as such. Suitable metals in this group would be among those in the II subgroups of the I and IV groups of the periodic table and the I subgroups of the V, VI and VII groups and all the metals in the VIII group.

A feature of the invention relates to the application of various complex matrices which may be applied to the cathode core and activated independently of the chemical constituents of the core, its mechanical configuration or the relative configuration of the cathode and other electrodes or elements in the device.

Furthermore, when the metallic reducing agent of this invention is employed, the reduction may continue slowly during the operating life of the device, replacing active material lost by evaporation, and without evolution of injurious gases.

The metallic reducing agent, in addition to having a reaction function, also serves as a depository surface and promotes the retention of the active metal throughout the life of the device, since a residual quantity of the metal will remain in the coating matrix.

The invention is particularly adapted for use with a cathode, either of the filamentary or the equipotential type, employed in electronic discharge devices, gaseous tubes and cold electrode devices in which electrons emanate from a composite matrix coating on the cathode, usually termed an oxide coated type. This composite coating is far more stable than a thin film of active metals on massive metallic surfaces and the activity and operating life of the cathode may be more easily controlled and prolonged.

A typical composite cathode involves a matrix of three general components, namely, a mass of inert refractory material, a proportional amount of finely divided particles of a stable metal scattered throughout the inert material, and an active metal associated or alloyed with the finely divided metallic particles. Such a cathode requires activation by bombardment or other generating media to develop the active metal which is derived from compounds initially placed in the matrix.

According to this invention a composite matrix is provided with the activating medium in situ where it also performs the additional functions of serving as the stable metal for the retention of the active metal dispersed throughout the matrix and forms a complementary separating component.

More specifically, the invention contemplates a composite matrix involving an active metal of the earth metal group, such as barium, cerium or barium and strontium which is derived from a compound or compounds of the metals included in the coating mixture, preferably the carbonates of barium and strontium. The repository metal which is also the reducing or activating agent is a metal contained in the III and VI series of the periodic table III and IV groups, which include aluminum, zirconium and silicon. The inert refractory component is preferably the oxide of the activating agent, such as aluminum oxide, zirconium oxide and silicon dioxide.

For instance, the coating mixture may comprise barium and strontium carbonates, finely divided particles of aluminum and a large proportion of aluminum oxide. Such a mixture when suspended in a binder medium of cellulose nitrate and amyl acetate may be easily applied as a coating to any suitable base metal which is capable of serving as a cathode for a discharge device. A typical composition may be as follows: aluminum oxide 80%, finely divided aluminum 10%, barium carbonate 5% and strontium carbonate 5%. After drying the coating the carbonates may be decomposed by heating in a vacuum to form barium and strontium oxides. The cathode is mounted in an enclosing vessel preferably with other cooperating electrodes, and the vessel evacuated by the usual processes. After a high degree of vacuum is obtained the cathode is heated either by passing current through it or by the high frequency induction method to decompose the carbonates to oxides and upon further heating, a reaction occurs between the barium and strontium oxides and the aluminum particles to form small amounts of free barium or barium and strontium.

Subsequent to the formation of the barium, this active metal will combine with the remaining particles of aluminum in the matrix either alloying therewith or being adsorbed on the surface of the particles where it is retained in an active form until diffused through the matrix to the surface. Some of the barium will also permeate the matrix and be deposited on the surface as a thin film or adsorbed layer where it is volatilized off by heating during the emission period, the reservoir supply of barium in the matrix being diffused to the surface to replenish the barium lost by evaporation.

The activated cathode thus consists of a matrix of refractory separating material, such as aluminum oxide and barium and strontium oxides, finely divided particles of a retention metal, such as aluminum, and free alkaline earth metal, such as barium, adsorbed upon or alloyed with the aluminum particles both in the interior and upon the geometrical surface of the coating matrix.

In a similar manner the composite matrix coating may consist of barium and strontium carbonates, metallic zirconium and zirconium oxide in which the zirconium is the repository and reducing agent. The zirconium and zirconium oxide may be replaced by silicon and silicon dioxide. Similarly, cerium, and other rare earth metals may be substituted for the barium and serve as the active metal.

While the reaction metal particles may also serve as the repository surface for the active metal, it may be reenforced or displaced by a metal less volatile than the active metal, such as nickel, or other metals or compounds of metals, for instance, copper, silver and gold in subgroup II of group I of the periodic table, tin and lead in subgroup II of group IV, vanadium and tantalum in subgroup I of group V, chromium, molybdenum, tungsten and uranium in subgroup I of group VI, manganese in subgroup I of group VII and iron, cobalt, nickel, ruthenium, rhodium, palladium, osmium, irridium and platinum in the VIII group. Ordinarily these metals when reduced to a fine particle state conglomerate in the coating and fail to disperse throughout the coating matrix. For this reason it is preferable to add the metal such as nickel in the coating suspension as a compound and for best results nickel carbonate seems to answer the purpose. A particular advantage of the additional repository metal in the coating is realized in the event that the reaction metal, such as aluminum, is completely vaporized during the reaction process, then the active metal, such as free barium, may associate with the additional depository metal.

In the previous specific combinations of matrix coating, the inert refractory oxide or separating mass is designated as a compound substance of the metallic reducing reaction component. Such combinations are readily suggested because of their physical properties. However, it is not essential to the results of this invention that the relative components other than the active metal component are to be strictly followed since it is possible to derive numerous combinations of the separate components mentioned above to realize the full possibilities of the invention. For instance, a combination may be formed of barium as the active metal, aluminum as the reaction component and zirconium oxide as the inert refractory element. Similarly, zirconium may be substituted for the aluminum and aluminum oxide or silicon dioxide may take the place of zirconium oxide. In another composition barium and strontium or cerium may be combined with silicon and aluminum oxide or the silicon may be supplemented by nickel, platinum, tin or copper.

Other possible mixtures may be obtained by transposing the relative components of the matrix coating to secure a high degree of electron activity, to secure a more controlled process of producing a homogeneous matrix of definite and adjustable proportions, and a stable and relatively long operating life for a cathode of a discharge device.

What is claimed is:

1. A composite cathode structure comprising a core and a composition coating on said core including as essential elements an easily reducible electron producing metal compound, a reaction agent of one of the metals of the group consisting of aluminum, silicon, and zirconium, and an inert refractory compound.

2. A composite cathode structure comprising a core and a composition coating on said core including easily reducible compounds of the earth metal group, a reducing agent of one of the metals of the group consisting of aluminum, silicon, and zirconium, and an inert refractory oxide.

3. A coating composition for forming a composite matrix on an electron emitting cathode core comprising barium and strontium carbonates, nickel carbonate, a reaction agent of one of the metals of the group consisting of aluminum, silicon and zirconium, and an inert refractory oxide of the reaction agent.

4. A composite cathode structure formed of a core and a coating composition on said cathode core comprising barium and strontium easily reducible compounds, finely divided particles of aluminum, and a large proportion of aluminum oxide.

5. A coating composition for electron emitting cathodes comprising a rare earth metal such as cerium, a reaction metal contained in the III and VI series of the periodic table of the III and IV groups, and a mass of refractory oxide of the reaction metal.

6. A composite coated cathode comprising a conducting core having a homogeneous matrix of earth metal group oxides commingled in a mass of an inert refractory substance in which a repository agent is present in finely divided particle form dispersed throughout the inert refractory mass, said agent being a metal of the group consisting of aluminum, silicon and zirconium, and an active earth metal combined with the repository agent.

7. A composite coated cathode comprising a conducting surface having a matrix of inert aluminum oxide and oxides of alkaline earth metals, finely divided particles of a metal of the group consisting of aluminum, silicon and zirconium dispersed throughout the oxides, and an active alkaline earth metal adsorbed on the surface of the finely divided particles of metal.

8. A composite cathode structure comprising a metallic core and a matrix coating thereon including a mixture of an inert highly refractory separating oxide, a reaction metal in the form of finely divided particles dispersed throughout the oxide, and an active earth metal combined with the reaction metal particles.

9. A thermionic cathode comprising a core and a composite matrix coating on said core including a mixture of an inert highly refractory separating material, earth metal group oxides scattered throughout the separating material in less proportion than said separating material, a reaction metal of the group consisting of aluminum, silicon and zirconium in the form of finely divided particles dispersed throughout said oxides and separating material, and an active earth metal, a residuum of said reaction metal particles serving as a repository for said active earth metal.

10. A thermionic cathode comprising a conducting core and a composite matrix coating applied to the surface thereof comprising a mixture of an inert refractory separating material, earth metal group oxides scattered throughout the separating material in less proportion than said separating material, a reaction metal of the group consisting of aluminum, silicon and zirconium in the form of finely divided particles dispersed throughout said oxides and separating material, an active earth metal, and a dispersion of metallic particles less volatile than said active metal in the matrix forming a depository for a reserve supply of said active earth metal.

11. A thermionic cathode structure comprising a core and a composite matrix coating covering said core including a mixture including a mass of aluminum oxide, barium and strontium oxides scattered throughout the aluminum oxide in less proportion than said aluminum oxide, finely divided particles of metallic aluminum dispersed throughout said oxides, and a reservoir supply of free barium associated with the metallic aluminum particles in said matrix.

12. A composite matrix coating for an electron emitting surface comprising a mixture of inert aluminum oxide of substantial mass, barium and strontium oxides scattered throughout the aluminum oxides in less proportion than said aluminum oxide, finely divided particles of nickel and aluminum dispersed throughout said oxides, and a reservoir of free barium associated with said nickel particles in said matrix.

13. A method of directly activating a cathode for the emission of electrons which comprises coating a conductive surface with a complex mixture of earth metal easily reducible compounds, a metallic reducing agent of the group of metals consisting of aluminum silicon and zirconium in finely divided form, and a highly refractory inert oxide, mounting said cathode in an evacuated container, and heating said cathode to convert the earth metal compounds to oxides and the earth metal oxides to free active metal by reaction with said reducing agent.

14. A method of directly activating a cathode for the emission of electrons which comprises coating a conductive surface with a complex mixture of earth metal easily reducible compounds, a metallic reducing agent of the group of metals consisting of aluminum, silicon and zirconium in finely divided form, and a highly refractory inert oxide, heating the cathode to decompose the compounds to oxides, and heating said cathode in vacuum to cause a reaction between said reducing agent and the earth metal oxides to form free active metals.

15. A method of directly activating a cathode for the emission of electrons which comprises coating a conductive surface with a complex mixture of earth metal easily reducible compounds, a metallic reducing agent of the group of metals consisting of aluminum, silicon and zirconium in finely divided particle form, and a highly refractory inert oxide, heating the cathode to decompose the compounds to oxides, heating said cathode in vacuum to cause a reaction between said reducing agent and the earth metal oxides to form free active metal, and alloying said free active metal with a residuum of said metallic particles.

16. A method of directly activating a cathode for the emission of electrons which comprises coating a conductive surface with a complex mixture of alkaline earth compounds, finely divided particles of metallic aluminum and a mass of aluminum oxide, heating the cathode to decompose the alkaline earth compounds to oxides, and heating said cathode in vacuum to cause a reaction in said metallic aluminum and the alkaline earth oxides to form free alkaline earth metal.

17. A method of directly activating a cathode for the emission of electrons which comprises coating a conductive surface with a matrix of barium and strontium carbonates, nickel carbonate, aluminum and aluminum oxide, heating said cathode to decompose the carbonates to oxides, heating said cathode in a reducing atmosphere to convert the nickel oxide to metallic nickel, heating said cathode to cause a reaction between said aluminum and barium and strontium oxides to form free barium and alloying said free barium with the residuum of metallic aluminum contained in the matrix.

CHARLES H. PRESCOTT, JR.